(12) United States Patent
Meessen et al.

(10) Patent No.: US 8,622,325 B2
(45) Date of Patent: Jan. 7, 2014

(54) PROCESS FOR PRODUCING GRANULES

(75) Inventors: Jozef Hubert Meessen, Wijlre (NL);
Willem Frederik Roos, Hoensbroek (NL); Johannes Lambertus Kursten, Weert (NL)

(73) Assignee: Stamicarbon B.V. (NL)

( * ) Notice: Subject to any disclaimer, the term of this patent is extended or adjusted under 35 U.S.C. 154(b) by 79 days.

(21) Appl. No.: 13/321,498

(22) PCT Filed: May 11, 2010

(86) PCT No.: PCT/EP2010/056418
§ 371 (c)(1),
(2), (4) Date: Apr. 9, 2012

(87) PCT Pub. No.: WO2010/133474
PCT Pub. Date: Nov. 25, 2010

(65) Prior Publication Data
US 2012/0187223 A1    Jul. 26, 2012

(30) Foreign Application Priority Data

May 20, 2009 (EP) .................................. 09160761

(51) Int. Cl.
*C05C 9/00* (2006.01)
*C05D 9/00* (2006.01)

(52) U.S. Cl.
USPC .................................... 241/3; 241/78; 241/81

(58) Field of Classification Search
USPC ................................................ 241/3, 78, 81
See application file for complete search history.

(56) References Cited

U.S. PATENT DOCUMENTS 2,963,359 A * 12/1960 Moore et al. ...................... 71/41
2,987,263 A *  6/1961 Senn ................................ 241/76

(Continued)

FOREIGN PATENT DOCUMENTS

DE    198 26 570 A1   12/1999
EP    0 026 918 A     4/1981

(Continued)

OTHER PUBLICATIONS

International Search Report for PCT/EP2010/056418 Dated May 11, 2010.

*Primary Examiner* — Dana Ross
*Assistant Examiner* — Onekki Jolly
(74) *Attorney, Agent, or Firm* — Banner & Witcoff, Ltd.

(57) ABSTRACT

The present invention relates to a process for the production of granules from a liquid composition with a decreased dust production, the process steps are as follows: applying the liquid composition onto solid particles that are kept in a continuous movement by a gas stream in a granulation zone of an oblong granulator, thereby depositing and solidifying liquid composition around the solid particles to increase the size of the particles and thereby form grown solid particles; discharging a stream of the grown solid particles from the granulation zone, dividing, in a size-sorting apparatus, the stream of grown solid particles into individual streams based on the size of the grown solid particles to thereby produce streams of undersized, oversized, and desired-sized grown solid particles; transferring the stream of oversized grown solid particles to a size-reducing apparatus; crushing the stream of oversized grown solid particles in the size-reducing apparatus, thereby reducing the particle size of the oversized grown solid particles and thereby producing a stream of crushed solid particles wherein that stream of crushed solid particles is introduced in the granulator at a place below the place where the gas stream leaves the granulator.

4 Claims, 4 Drawing Sheets

(56) References Cited

U.S. PATENT DOCUMENTS

| | | | |
|---|---|---|---|
| 3,876,157 A * | 4/1975 | McIntire et al. | 241/17 |
| 3,928,015 A * | 12/1975 | Siegel et al. | 71/28 |
| 4,330,319 A * | 5/1982 | Bexton et al. | 71/28 |
| 4,332,211 A * | 6/1982 | Nioh et al. | 118/62 |
| 4,353,730 A * | 10/1982 | Kinno et al. | 71/29 |
| 4,501,773 A * | 2/1985 | Nioh et al. | 427/213 |
| 6,179,893 B1 * | 1/2001 | Bendix et al. | 71/28 |
| 2007/0131381 A1 * | 6/2007 | Schermutzki et al. | 164/479 |

FOREIGN PATENT DOCUMENTS

| | | |
|---|---|---|
| FR | 2 519 334 A | 7/1983 |
| GB | 2115800 A | 9/1983 |

* cited by examiner

PROCESS FOR PRODUCING GRANULES

CROSS-REFERENCE TO RELATED APPLICATIONS

This application is a U.S. National Stage application under 35 U.S.C. §371 of International Application PCT/EP2010/056418 (published as WO 2010/133474 A1), filed May 11, 2010, which claims priority to Application EP 09160761.4, filed May 20, 2009. Benefit of the filing date of each of these prior applications is hereby claimed. Each of these prior applications is hereby incorporated by reference in its entirety.

FIELD OF THE INVENTION

The invention relates to a process for producing granules from a liquid material by applying the liquid material onto solid particles circulating in the granulation zone of a granulator, thereby causing particle growth. The solid particles are kept circulating by a gas stream, that enters the granulator from the bottom side and leaves the granulator at the topside. The stream of particles exiting from the granulation zone is then sorted by a size-sorting apparatus into three streams of particles based on size: desired, under, and over sized particles. The stream of undersized particles is returned to the granulation zone while the stream of desired size particles is sent to product storage. The stream of oversized particles is sent to a size-reducing or crushing apparatus where it is crushed and then sent back to the granulator. The stream of desired-sized particles is withdrawn for future use or sale.

BACKGROUND OF THE INVENTION

Various processes by which solid particles can be produced from liquid materials, such as solutions, melts or suspensions, are well known in the art. Of particular interest are the granulation processes, such as that described in Nioh et al. (EP-A-0-026-918). Nioh et al. describe a spouted-bed granulation process, in which a liquid material, in a gas stream, is passed centrally from under and upward through a mass of particles and a number of particles are entrained from this mass by the gas stream and which subsequently, when the velocity of the gas stream decreases, fall back onto the surface of the mass of particles. In this mass of particles there are also present particles originating from a stream of undersized particles and from a stream of oversized particles after being crushed in a size-reducing apparatus.

Another type of granulation process wherein particle growth occurs uses a fluidized bed as the granulator. Such a process is described by Niks et al. in U.S. Pat. No. 4,219,589. In that process, a gas stream atomizes the liquid material to fine droplets which then solidify on nuclei in the fluidized bed. The solidified particles are then removed from the granulator and separated into three streams of particles on the basis of size. The stream of oversized particles are crushed, combined with the stream of undersized particles and returned to the fluidized bed.

Musters in European patent EP-A-0-141-436 describes a fluid bed granulation process in which the liquid material is discharged from a liquid distribution system in the form of a virtually closed, conical film. Nuclei from the bed are moistened with the liquid as they are carried through the conical film with the aid of a powerful gas stream.

The above mentioned granulation processes can be carried out in fluid bed granulators of different shapes. Both box-shaped granulators, as well as cylindrical shaped granulators are known (see e.g. Hans Uhlemann-Lothar Mörl, Wirbelschicht-Spruhgranulation, Springer ISBN 3-540-66985-X, pages 238-241). Box-shaped granulators have a rectangular cross-section in a horizontal plane, whereas cylindrical shaped granulators do have a circular or elliptical cross section in the horizontal plane. Both types of granulators can be characterized in the length (L) and width (W) of the cross section in a horizontal plane. Length L here being defined as the longest horizontal distance between the walls of the granulator, and width as the shortest distance between the granulator walls in the horizontal cross section. The case where L=W in this way characterizes special cases: respectively a square or circular cross section in a horizontal plane. In the field of the present invention it is useful to define oblong granulators as a granulator of any of the above shapes, however with a length that is at least twice as long as its width.

Drawbacks of all of these methods are the significant amount of dust produced during the granulation process or generally present in the granulation unit and the resulting accumulation of the dust in the granulation unit. For the purposes of the present invention, "dust" is defined as particles with a diameter less than 0.5 millimeters. Generally, this dust is carried along by the air stream to the areas of the granulation unit, especially the top, not contacted frequently by granules and deposits there. As the deposits accumulate, large lumps break off and fall down to block the granulator and/or the liquid spray apparatus and thus seriously disturb the granulation process. As a general matter, when this occurs, the granulation process must be stopped and the granulator cleaned. The cleaning procedure and resulting production outage can last 8 to 24 hours depending on such factors as the degree of fouling, composition of the granules and the type of equipment.

The dust generated by and present in a granulation system is caused primarily by three sources.

As a first source of dust there is dust formed by attrition of the granules movements and collisions in the fluidized bed. The amount of dust originating from this source depends very much on the product properties. For many types of product, the relevant properties (hardness, surface structure, abrasion resistance) are such that the amount of dust formed through attrition is rather low.

As a second source of dust, there is dust formed in the process of contacting the liquid introduced into the granulator with the granules in the fluidized bed. The amount of dust formed through this contacting process may vary. In case a spraying concept is used that produces fine droplets (as is the case with many commercial available two-phase sprayers), then such sprayers always produce droplets with a spread in diameter. The finest droplets produced in such sprayers will solidify before hitting a granule and leave the fluidized bed together with the air in the form of dust. If however, the spraying concept used is of the film spraying type, then the amount of dust formed at the sprayers can be very low.

As a third source of dust, there is the dust that is formed in the crushers. The main purpose of the crushing is a limited reduction of the size of the product as it is flowing to the crusher. For instance, if the final product is required in the 2-4 mm range, then typically the task of the crusher will be to produce granules with a diameter in the 1-2 mm range. Inherently to the process of crushing however is the formation of a product fraction with a smaller diameter. Crushed product produced with a diameter less then 0.5 mm shall be classified as 'dust', since it will be entrained with the airflow in the granulator.

SUMMARY OF THE INVENTION

An object of the invention is to process granules produced by granulation in such a manner that the amount of product dust to which the granulator is exposed is greatly reduced. This dust reduction will result in a lower rate of dust deposition in the granulator, resulting in a lower cleaning frequency and, thus, higher production rates.

The present invention of a process for the production of granules from a liquid composition involves applying the liquid composition onto solid particles that are kept in a continuous movement by a gas stream in a granulation zone of an oblong granulator, thereby depositing and solidifying said liquid composition around said solid particles to increase the size of the particles and thereby form grown solid particles; discharging a stream of said grown solid particles from the granulation zone, dividing, in a size-sorting apparatus, said stream of said grown solid particles into individual streams based on the size of said grown solid particles to thereby produce streams of undersized, oversized, and desired-sized grown solid particles; transferring said stream of said oversized grown solid particles to a size-reducing apparatus; crushing said stream of said oversized grown solid particles in said size-reducing apparatus, thereby reducing the particle size of said oversized grown solid particles and thereby producing a stream of crushed solid particles, that are introduced into the granulator. The stream of desired-sized grown solid particles is withdrawn and either stored for future sale or sent onto another process.

The applicant has found that the above object can be realized by introducing said stream of crushed solid particles in the granulator at a place below the place where the gas stream leaves the granulator. This way of re-introducing the stream of crushed solid particles into the granulator reduces the amount of dust which accumulates in the granulator and thereby increases the time between production shutdowns due to granulator cleaning. The invention is especially effective when the granulator is shaped oblong.

The invention is applicable in several types of fluid bed granulation processes. It is however especially suitable in granulation processes where the product has low attrition behavior, and where a film spraying concept is used for the introduction of the melt into the fluidized bed.

DETAILED DESCRIPTION OF THE INVENTION

Figure 1:
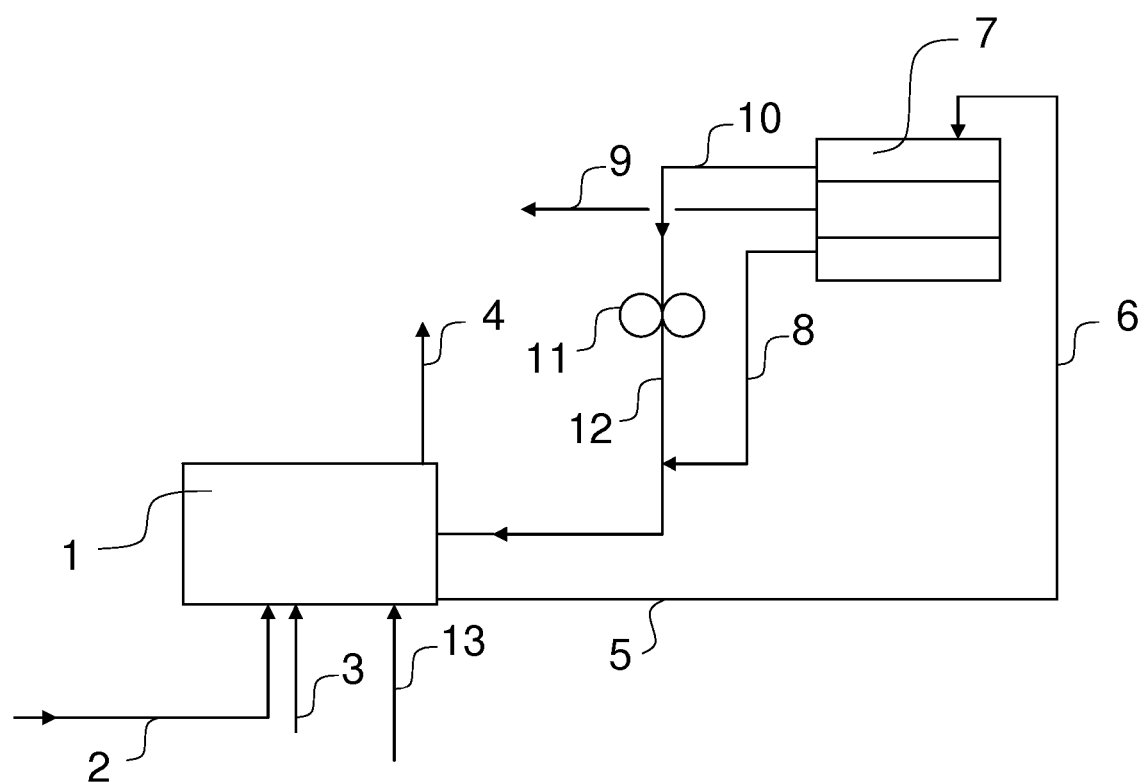
FIG. 1 is a schematic process diagram of an embodiment of the present invention.

The present process for the production of granules from a liquid composition, such as, for example, a solution, melt, or suspension, involves applying the liquid composition onto solid particles of the same composition kept in a continuous movement by a gas stream in a granulation zone of an oblong granulator, thereby causing solid particles of the composition to grow, and then discharging, when, for example, the solid particles grow to a selected size, a stream of the grown solid particles from the granulation zone. An oblong granulator is here and hereafter understood to be a granulator of which the length L and its width W have a ratio of at least 2.

The stream of grown solid particles is then separated by a size-sorting apparatus, for example, a sizing sieve or screen, into streams based on the size of the grown solid particle; thus producing streams of undersized, oversized, and desired-sized grown solid particles. These particle streams are each treated differently.

The stream of undersized grown solid particles can be returned to the granulation zone. The stream of oversized grown solid particles is transferred to a size-reducing apparatus, for example, a double roll crusher, to be crushed with the resulting stream of crushed solid particles being introduced into the granulator at a place below the place where the gas stream leaves the granulator. Under a place below the place where the gas stream leaves the granulator is understood a place on a line straight below the center of the leaving gas stream or a place that is in a horizontal direction not further removed from that line than L/10, wherein L is the lengths of the oblong granulator.

The stream of desired-sized grown solid particles is withdrawn from the process and either stored or sent onto another process.

Preferably, the stream of grown solid particles leaving the granulator is cooled in a cooler.

Both the cooler and the granulator are preferably operated at a slight underpressure. "Slight underpressure" means an underpressure of about 0 to 10 mbar, preferably 0 to 7 mbar.

The liquid composition can be applied onto the solid particles in the form of droplets. Preferably the liquid composition is applied onto the solid particles in the form of a film. This significantly reduces the amount of dust formed in this point in the process.

Generally, the stream of undersized particles is re-introduced into the granulator. Preferably, the stream of undersized particles is re-introduced in the granulator with the stream of crushed solid particles.

This invention can be applied to all sorts of liquid compositions in the form of a solution, melt or suspension. Examples of suitable materials to be granulated are ammonium salts, such as ammonium nitrate, ammonium sulfate or ammonium phosphate as well as mixtures thereof, simple fertilizers such as calcium ammonium nitrate, magnesium ammonium nitrate, compound NP and NPK fertilizers, urea, urea-containing compositions, sulfur and the like. The invention is particularly suited for granulating simple and complex fertilizers and especially for granulating urea.

The invention can suitably be applied to various granulation processes in which both the undersized and the crushed oversized particles are recirculated entirely within the granulation process. Examples thereof are fluid bed granulation and spouted bed granulation, such as are described in Perry's Chemical Engineers' Handbook, pgs. 8-71, 20-59 to 20-74 (6th Ed., 1984), the complete disclosure of which is incorporated herein by reference.

The process according to the invention can be carried out in, for example, an installation, as generally described in, for example, U.S. Pat. No. 4,219,589, the complete disclosure of which is incorporated herein by reference, consisting of a granulator such as a fluid bed granulator, a cooler, a screening apparatus, an apparatus for crushing oversized particles and a gas/solid separating apparatus for separating solid particles from the gas stream leaving the granulator and/or the cooler.

FIG. 1 is a schematic representation showing one embodiment of the present invention. For the production of granules from a liquid composition, such as a urea solution, a solution of the liquid composition is passed e.g. from a storage vessel (not shown) through line 2 to a granulator 1 and is sprayed into the granulator with or without the aid of a gas stream 3, whereby the granules form and are continuously discharged from the granulator via line 5.

The temperature in the granulator is between about 60° C. and about 180° C. and in the case of urea granulation preferably between about 90° C. and about 140° C. The amount of gas in gas stream 3 is in the range from about 1 to about 10 kilogram per kilogram of liquid composition. The temperature of gas stream 3 is about 20° C. to about 180° C. and in the case of urea granulation preferably between about 90° C. and about 140° C.

In the case of a fluid bed or a spouted bed, fluidization gas, such as air, is supplied to the granulator through line 13.

The gas stream leaving the granulator is passed through line 4, e.g. to a gas/solids separating apparatus (not shown) such as a cyclone or scrubber, where solid material, primarily dust, is separated from the gas carrying it. The dust separated from the gas stream can be returned, optionally diluted with a solvent such as water, to the storage vessel and optionally after separating of the solvent, e.g. in an evaporation unit, re-supplied to the granulator 1.

Figure 2:
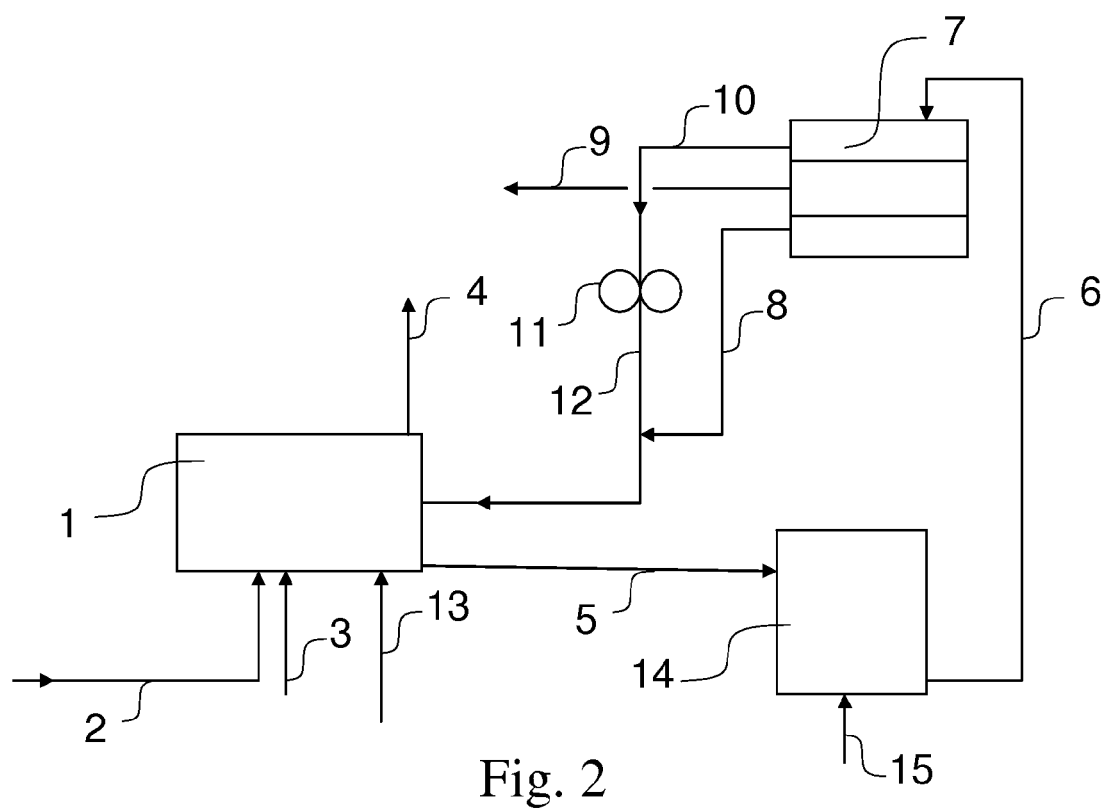
FIG. 2 is a schematic process diagram of another embodiment of the present invention.

The granulate leaving the granulator 1 via line 5 can be cooled in a cooler 14, as indicated in FIG. 2 with the aid of a gas stream 15 supplied to the cooler, where after the granulate is passed through line 6 to a size-sorting or screening apparatus 7. The temperature of the gas stream 15 supplied is between about 10° C. and about 80° C. and the amount is between about 0.5 and about 5 kilograms of gas per kilogram of granules supplied to the cooler. In the case of urea granulation the temperature of the gas stream is preferable between about 10° C. to about 50° C. and the temperature at which the urea granules exit the cooler is between about 20° C. and about 80° C., more preferably between about 25° C. and about 75° C.

In the size-sorting or screening apparatus 7 the granulate is divided into three streams, namely oversized, desired-sized and undersized particles. The undersized particles can be returned via line 8 to the granulator 1 to serve as nuclei on which solid particles of the liquid composition can grow during the granulation process.

Desired-sized particles pass via provision 9 to e.g. a storage (not shown) where after they may be sold or used in a downstream process. Oversized particles are passed through line 10 to a size-reducing or crusher apparatus 11 where they are converted into crushed particles with an average particle diameter of about 1.2 to about 2.4 mm, preferably about 1.5 to about 2.1 mm if the desired-sized product has a diameter of about 2 to about 4 mm. Dust formation is inherent in this crushing process. An overview of such crushing equipment can for example be found in Perry and Chilton Chemical Engineers Handbook, fifth edition pages 8-16 to 8-57. For the present invention especially the equipment called Roll-crushers as described in this reference on pages 8-19 to 8-22 are suitable.

In the case of urea granulation, the desired-sized particle usually has preferably a granule diameter of between about 2 and 4 mm. The oversized particle has a diameter greater than about 4 mm and the undersized particle has a diameter less than about 2 mm. However, other granule diameters are applicable also. In the case of, for example, the production of urea granules for forestry with aerial application, the granule diameter of a desired-sized particle is between 5 and 15 mm, preferably between 7 and 10 mm.

The crushed particles, along with the dust produced in the crushing process, are returned through line 12 to the granulator 1 at a place below the place where the gas stream leaves the granulator 1. This step reduces the amount of dust which accumulates in the granulator and thereby increases the time between production shutdowns due to granulator cleaning.

The following non-limiting examples further describe the present invention.

Comparative Example A

Figure 3:
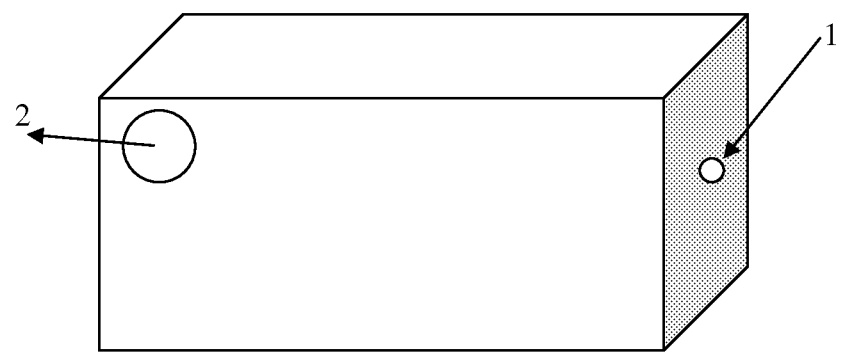
FIGS. 3 and 4 depict box-shaped oblong fluidized bed granulators according to embodiments of the invention.

A urea granulation plant with a capacity of 2000 ton/day was equipped with a box-shaped oblong fluidized bed granulator. This granulator had an L/W ratio of 3.1. The granulator was supplied with film-type spraying devices for the introduction of the urea melt into the granulator. The air outlet of this granulator was located in the side wall of the granulator. The undersize product, together with the crushed oversize product were fed into the granulator at a location nearly opposite to the air outlet as shown in FIG. 3, wherein 1 denotes the inlet of undersized and crushed oversized product and 2 represents the place where the gas stream leaves the granulator.

The granulator was put into continuous operation. In one year time the granulation process had to be stopped 8 times for cleaning. The average time required for stopping, cleaning and restart of the granulation process was 6 hours. Thus there was a loss of production time of 48 hours per year.

Example 1

Figure 4:
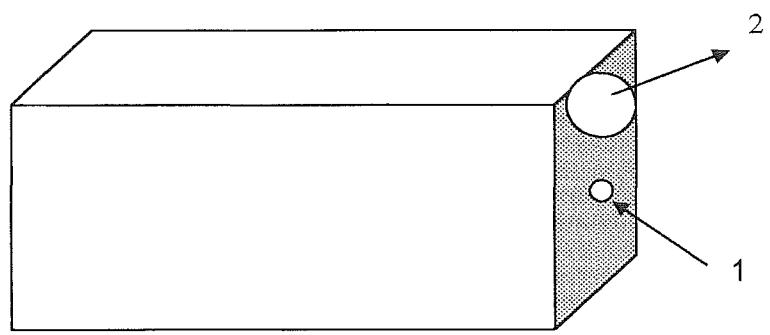

Another urea plant with a capacity of 2000 MTD was equipped with a box-shaped oblong fluidized bed granulator. This granulator had an L/W ration of 4.2. The granulator was supplied with film-type spraying devices for the introduction of the urea melt into the granulator. The air outlet of this granulator was located in one of the short side walls of the granulator. The undersize product, together with the crushed oversize product were fed into the granulator in the same side wall, at a location directly underneath of the air outlet as shown in FIG. 4, in which 1 represents the inlet of undersized and crushed oversized product and 2 represents the place where the gas stream leaves the granulator.

The granulator was put into continuous operation. In one year time the granulation process had to be stopped 3 times for cleaning. The average time required for stopping, cleaning and restart of the granulation process was 6 hours.

Thus there was a loss of production time of only 18 hours per year.

The invention claimed is:

1. A process for the production of granules from a liquid composition, said process comprising the steps of: applying the liquid composition onto solid particles that are kept in a continuous movement by a gas stream in a granulation zone of an oblong granulator, thereby depositing and solidifying said liquid composition around said solid particles to increase the size of the particles and thereby form grown solid particles; discharging a stream of said grown solid particles from the granulation zone, dividing, in a size-sorting apparatus, said stream of said grown solid particles into individual streams based on the size of said grown solid particles to thereby produce streams of undersized, oversized, and desired-sized grown solid particles; transferring said stream of said oversized grown solid particles to a size-reducing apparatus; crushing said stream of said oversized grown solid particles in said size-reducing apparatus, thereby reducing the particle size of said oversized grown solid particles and thereby producing a stream of crushed solid particles; characterized in that said stream of crushed solid particles is introduced in the granulator at a place on a line straight below the center of the leaving gas stream or a place that is in a horizontal direction not further removed from that line than L/10, wherein L is the lengths of the oblong granulator.

2. Process according to claim 1, wherein the stream of grown solid particles leaving the granulator is cooled in a cooler.

3. Process according to claim 1, wherein the liquid composition is applied onto the solid particles in the form of a film.

4. Process according to claim 1, wherein the stream of undersized particles is re-introduced in the granulator with the stream of crushed solid particles.

* * * * *

UNITED STATES PATENT AND TRADEMARK OFFICE
CERTIFICATE OF CORRECTION

PATENT NO.       : 8,622,325 B2
APPLICATION NO. : 13/321498
DATED            : January 7, 2014
INVENTOR(S)      : Meessen et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 218 days.

Signed and Sealed this
Twenty-second Day of September, 2015

Michelle K. Lee
*Director of the United States Patent and Trademark Office*